June 12, 1928.  
J. E. POINTON  
BREAD BAKING MACHINERY  
Filed Dec. 5, 1925

J. E. POINTON  
INVENTOR

By: Marks and Clerk  
Attys

June 12, 1928. 1,672,954
J. E. POINTON
BREAD BAKING MACHINERY
Filed Dec. 5, 1925 2 Sheets-Sheet 2
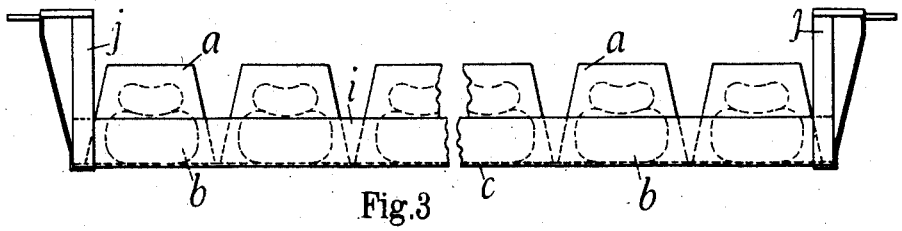
Fig.3
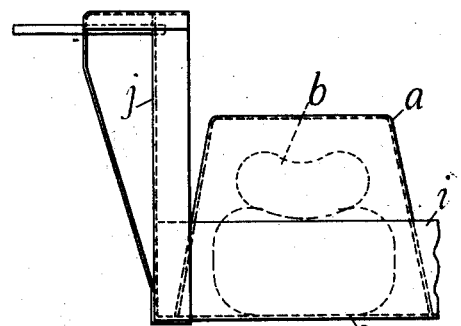
Fig.4
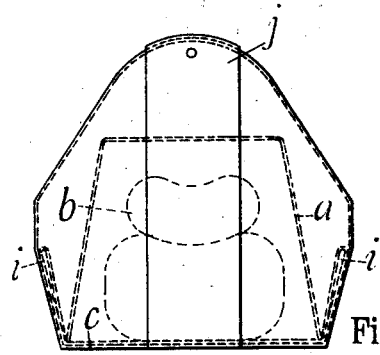
Fig.5 J. E. POINTON
INVENTOR
By: Marks & Clark
ATTYS Patented June 12, 1928.

1,672,954

UNITED STATES PATENT OFFICE.

JOHN EDWARD POINTON, OF PETERBOROUGH, ENGLAND, ASSIGNOR TO BAKER PERKINS COMPANY INCORPORATED, OF NEW YORK, N. Y.

BREAD-BAKING MACHINERY.

Application filed December 5, 1925, Serial No. 73,435, and in Great Britain February 13, 1925.

This invention relates to bread baking machinery including continuous bread baking ovens of the type having an endless chain conveyor provided with swinging trays or shelves whereon the loaves are carried in a circuitous course through the oven or baking chamber between rows or tiers of heating elements.

The object of the invention is to provide simple and convenient means for maintaining the symmetrical form of the loaves during the baking process and throughout their progress through the oven.

The invention comprises the employment of shields, covers, or the like for the loaves whereby they are protected from the action of convection currents or other influences tending to promote distortion, such protection being afforded without interference with the usual expansion or growth of the loaves that occurs during the baking process.

Referring to the two accompanying sheets of explanatory drawings:—

Figure 3 is an elevation showing, to a larger scale, one of the shelves with the cradle like ends whereby it is suspended from the conveyor, whilst Figure 4 is an elevation to a still larger scale, showing one of said cradle end and a portion of a shelf, and Figure 5 an end view of the same.

Like reference letters in the different views indicate the same or similar parts.

In the illustrated application of the invention the said shields, guards, or covers as $a$ are of sheet metal or other suitable material and of tubular and conical form and may be open at each end, each shield being preferably of such size as to permit of its being placed over one loaf as $b$ when the latter has been set on a tray or shelf $c$ but without contact with the loaf. Such insertion of a shield over each loaf can be very readily effected when each shelf has its full complement of loaves set or placed thereon during the movement of the conveyor. Thus, as the shelves arrive before the operative at the front end $d$ of the oven or other convenient charging position, each shelf is charged with the loaves or dough portions to be baked and over each loaf on the shelf there is placed a shield such as aforesaid. The shields may advantageously be brought to the hands of the said operative by the shelf that immediately succeeds the shelf just charged with loaves or dough portions at the charging level. The shields carried on the shelf immediately succeeding that charged with dough portion are then lifted off and placed over the dough portions on the tray at the charging level, thus providing an empty tray ready to receive another charge of loaves or dough portion.

Figure 1:
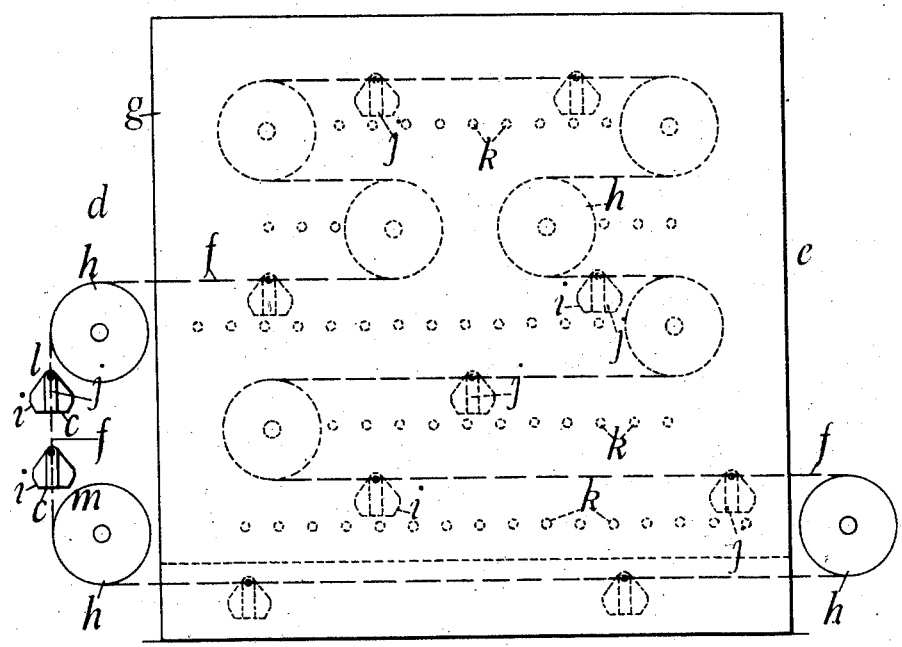
Figure 1 is an elevation showing, in diagrammatic form, one oven of the type aforesaid suitable for the application of the invention, whilst

In the example illustrated at Figure 1, $d$ is the front or charging end and $e$ the rear or discharging end of the oven. The endless chain conveyor $f$ extends circuitously through the oven $g$ being supported by guide pulleys as $h$. The shelves $c$, provided with a guard rail $i$ (Figure 5) extending along each side, are carried by or form part of cradle like ends $j$ pivotally mounted upon or slung from the conveyor $f$, and as the said shelves with the loaves $b$ thereon are carried in a circuitous course through the oven, they pass between the steam tube or other known heating elements as $k$. The loaves as $b$ are set or placed on the shelves $c$, and a shield or cover as $a$ put over the loaves, at the front end $d$ of the oven. At the rear end $e$ of the oven the loaves and shields are removed from the shelves which then return to the front end for re-charging. On the arrival of the first loaded shelf at the rear end of the oven the operative at that end, after unloading the shelf permits it to return empty, or without shields thereon, to the front end but after unloading each succeeding shelf he returns the trays thereto. When the said empty shelf arrives at the position $l$ at the front of the oven the operative at that end fills same with loaves and places over them the shields or covers from the immediately following shelf at the position $m$. The shelf $m$ thus cleared passes on to the position $l$ where it is loaded with loaves and the shields or covers therefor as aforesaid. The same operation is repeated on all subsequent shelves as they arrive at and pass from the front of the oven.

The shields, guards, or covers $a$ may be made in various forms. Instead of providing a shield for each loaf one shield may cover a plurality or group of loaves. The shields may have closed tops. They may also be perforated. In the plan view at Figure 2, which shows a portion of the endless chain conveyor $f$ with three shelves slung therefrom, the shelf $f'$ is shown empty, the shelf $f^2$ is filled with loaves and on shelf $f^3$ each loaf is enclosed by a cover or shield $a$.

Figure 2:
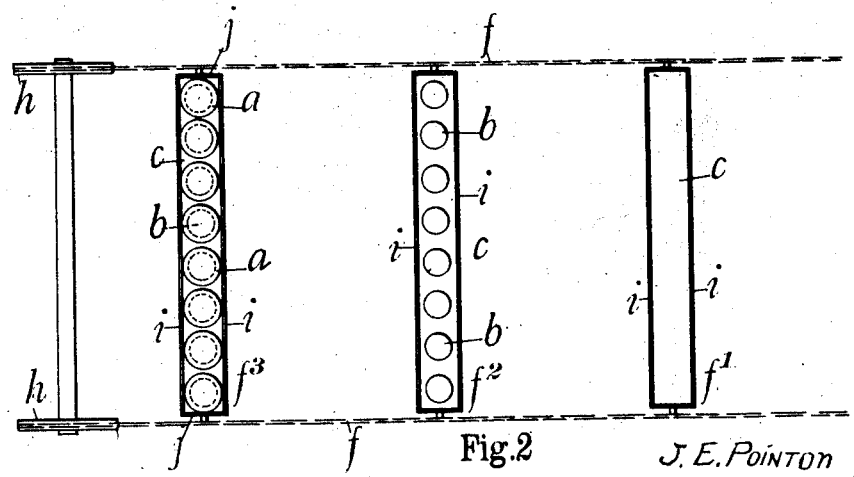
Figure 2 is a plan showing a portion of the endless chain conveyor of said oven with three of the shelves suspended therefrom.

It is also to be noted upon reference to Fig. 2 and 5 that the shields or covers $a$ are arranged in close relation with respect to each other longitudinally of the shelf and in close relation with the sides or guard rails $i$ so that excessive longitudinal or transverse movement of the trays is avoided even during a sudden starting or stopping of the endless chain carriers. It is to be appreciated also that the inner surfaces of the covers or shields will be suitably greased so that even should the loaves therein contact therewith they would not be materially damaged.

Having thus described my invention what I claim as new and desire to secure by Letters Patent is:—

1. In bread baking ovens, the combination comprising loaf shelves forming part of endless chain conveyors each shelf adapted to carry a plurality of loaves, and a shield for each loaf on each shelf, such shield forming with the shelf an enclosure so surrounding the loaf as to separate same from contact with its neighbours and maintain the symmetrical form of the loaf whilst affording freedom for the expansion of the same both longitudinally and laterally during the baking process.

2. In bread baking ovens the combination, of an endless chain conveyor operable through the oven and including a plurality of shelves each of which is adapted to carry a plurality of loaves, longitudinal guard rails on the sides of each of the shelves, a plurality of shields arranged in close relation with respect to each other longitudinally of each shelf and in close relation with the guard rails, one shield being arranged over each loaf and coacting with the shelf to form an enclosure so surrounding the loaf as to separate the same from contacting with adjacent loaves and in addition maintaining the symmetrical form of the loaf whilst affording freedom for the expansion of the same both longitudinally and laterally during the baking process.

In testimony whereof I have signed my name to this specification.

JOHN EDWARD POINTON.